(12) United States Patent
Luhadiya et al.

(10) Patent No.: US 6,811,800 B2
(45) Date of Patent: Nov. 2, 2004

(54) CALCIUM FORTIFIED BEVERAGES

(75) Inventors: Ashok Prem Chand Luhadiya, Cincinnati, OH (US); David Kee Yang, Manhattan, KS (US); Matthew Thomas Heisey, Cincinnati, OH (US)

(73) Assignee: The Procter & Gamble Co., Cinti, OH (US)

( * ) Notice: Subject to any disclaimer, the term of this patent is extended or adjusted under 35 U.S.C. 154(b) by 186 days.

(21) Appl. No.: 10/133,053

(22) Filed: Apr. 26, 2002

(65) Prior Publication Data

US 2003/0003192 A1 Jan. 2, 2003

Related U.S. Application Data

(63) Continuation-in-part of application No. 10/085,186, filed on Feb. 27, 2002, now abandoned, which is a continuation of application No. 09/893,841, filed on Jun. 28, 2001, now abandoned, which is a continuation of application No. 09/400,002, filed on Sep. 20, 1999, now abandoned, which is a continuation-in-part of application No. 09/162,864, filed on Sep. 29, 1998, now abandoned.

(51) Int. Cl.⁷ .............................. A23L 1/304; A23C 9/00
(52) U.S. Cl. ........................ 426/72; 426/580; 426/634
(58) Field of Search ........................ 426/580, 74, 634

(56) References Cited

U.S. PATENT DOCUMENTS

| | | | |
|---|---|---|---|
| 4,325,975 A | 4/1982 | Lindon et al. |
| 4,551,342 A | 11/1985 | Nakel et al. |
| 4,592,909 A | 6/1986 | Winer et al. |
| 4,701,329 A | 10/1987 | Nelson et al. |
| 4,722,847 A | 2/1988 | Heckert |
| 4,737,375 A | 4/1988 | Nakel et al. |
| 4,738,856 A | 4/1988 | Clark |
| 4,740,380 A | 4/1988 | Melachouris et al. |
| 4,830,862 A | 5/1989 | Braun et al. |
| 4,840,814 A | 6/1989 | Harada et al. |
| 4,851,221 A | 7/1989 | Pak et al. |
| 4,851,243 A | 7/1989 | Andersen et al. |
| 4,871,554 A | 10/1989 | Kalala et al. |
| 4,906,482 A | 3/1990 | Zemel et al. |
| 4,919,963 A | 4/1990 | Heckert |
| 4,992,282 A | 2/1991 | Mehansho et al. |
| 5,108,761 A | 4/1992 | Andon et al. |
| 5,128,374 A | 7/1992 | Kochanowski |
| 5,186,965 A | 2/1993 | Fox et al. |
| 5,215,659 A | 6/1993 | Ando |
| 5,232,709 A | 8/1993 | Saltman et al. |
| 5,389,387 A | 2/1995 | Zuniga et al. |
| 5,401,524 A | 3/1995 | Burkes et al. |
| 5,422,128 A | 6/1995 | Burkes et al. |
| 5,424,082 A | 6/1995 | Dake et al. |
| 5,445,837 A | 8/1995 | Burkes et al. |
| 5,500,232 A | 3/1996 | Keating |
| 5,597,595 A | 1/1997 | DeWille et al. |
| 5,609,898 A | 3/1997 | Kaji et al. |
| 5,670,344 A | 9/1997 | Mehansho et al. |
| 5,716,649 A | 2/1998 | Nam |
| 5,780,081 A | 7/1998 | Jacobson et al. |
| 5,786,006 A | 7/1998 | Lindon et al. |
| 5,817,351 A | 10/1998 | DeWille et al. |
| 5,834,045 A | 11/1998 | Keating |
| 5,851,578 A | 12/1998 | Gandhi |
| 5,855,936 A | 1/1999 | Reddy et al. |
| 5,897,892 A | 4/1999 | Jolivet et al. |
| 5,912,032 A | 6/1999 | Komatsu et al. |
| 5,928,691 A | 7/1999 | Reddy et al. |
| 6,024,994 A | 2/2000 | Jacobson et al. |
| 6,036,985 A | 3/2000 | Jacobson et al. |
| 6,039,986 A | 3/2000 | Mallangi et al. |
| 6,063,411 A | 5/2000 | Jacobson et al. |
| 6,106,874 A | 8/2000 | Liebrecht et al. |
| 6,150,399 A | 11/2000 | Patel et al. |
| 6,235,322 B1 | 5/2001 | Lederman |
| 6,242,020 B1 | 6/2001 | Jacobson et al. |
| 6,299,914 B1 | 10/2001 | Christiansen et al. |
| 6,342,257 B1 | 1/2002 | Jacobson et al. |
| 2003/0194468 A1 * | 10/2003 | Konkoly et al. ............... 426/34 |

FOREIGN PATENT DOCUMENTS

| | | |
|---|---|---|
| CN | 1090712 A | 8/1994 |
| CN | 1101501 A | 4/1995 |
| CN | 1113121 A | 12/1995 |
| CN | 1196889 A | 4/1997 |
| EP | 304986 A2 | 1/1989 |
| EP | 0449354 B1 | 2/1994 |
| EP | 586016 A1 | 3/1994 |
| EP | 781756 A1 | 7/1997 |
| EP | 397232 A1 | 11/1999 |

(List continued on next page.)

OTHER PUBLICATIONS

Power, Tardif, Layne & Schulkin; "Ingestion of calcium Solutions by Common Marmosets"; *American Journal of Primatology*; vol. 47, Issue 3, pp. 255–261, Feb. 1999.

Rasyid and Hansen; "Stabilization of Soy Milk Fortified With Calcium Gluconate"; *Food Hydrocolloids* vol. 4, No. 5, pp. 415–423, 1991.

Schleiffer & Gairard; "Blood Pressure Effects of Calcium Intake in Experimental Models of Hypertension"; *Seminars in Nephrology*; vol. 15, No. 6, pp. 526–535, Nov. 1995.

(List continued on next page.)

*Primary Examiner*—Helen Pratt
(74) *Attorney, Agent, or Firm*—Carl J. Roof

(57) ABSTRACT

Calcium fortified protein-containing beverages and processes for making them are disclosed. Such beverages are stable, contain high levels of soluble calcium and are hedonically acceptable. Unlike other calcium fortified protein-containing beverages, such beverages can be produced using a process that is similar to that used to produce regular dairy milk. Such beverages can be consumed neat or easily incorporated into other food or beverage products.

42 Claims, No Drawings

FOREIGN PATENT DOCUMENTS

| | | |
|---|---|---|
| GB | 2180733 A | 4/1987 |
| GB | 2256639 A | 12/1992 |
| GB | 2263857 A | 8/1993 |
| JP | 54-8767 | 1/1979 |
| JP | 5697248 | 7/1981 |
| JP | 59173044 | 3/1983 |
| JP | 6047635 | 3/1985 |
| JP | 6047636 | 3/1985 |
| JP | 5076279 | 3/1993 |
| JP | 5184292 | 7/1993 |
| JP | 94031284 | 2/1994 |
| JP | 95111879 | 5/1995 |
| JP | 97175994 | 7/1997 |
| JP | 98015562 | 1/1998 |
| JP | 10-262610 | 10/1998 |
| JP | 2000342175 | 12/2000 |
| SU | 2096975 | 11/1997 |
| WO | WO 92/19251 A1 | 11/1992 |
| WO | WO 94/00107 A1 | 1/1994 |
| WO | WO 98/43487 A1 | 10/1998 |
| WO | WO 99/24362 A2 | 5/1999 |
| WO | WO 00/64267 A1 | 11/2000 |
| WO | WO 01/72135 A1 | 10/2001 |

OTHER PUBLICATIONS

Vakhnin, Maksin, Samchenko & Ovchinnikov; "Conditioning Distillate to Produce Potable Water of the Calcium–Hydrocarbonate Class"; *Inst. Kolloidn, Khim. Khim. Vody, Kiev USSR Khim. Tekhnol. Vody*; 9(1), 70–3 Coden; KTVODL; ISSN: 0204–3556.

Vinas–Salas, Biendicho–Palau, Pinol–Felis, Miguelsanz–Garcia & Perez–Holanda; "Calcium Inhibits Colon Carcinogenesis in an Experimental Model in the Rat"; *European Journal of Cancer*; vol. 34, No. 12, pp. 1941–1945, Dec. 1998.

\* cited by examiner

CALCIUM FORTIFIED BEVERAGES

CROSS REFERENCE TO RELATED APPLICATIONS

This application is a continuation-in-part of U.S. Ser. No. 10/085,186, filed Feb. 27, 2002, now abandoned, which is a continuation of U.S. Ser. No. 09/893,841, filed Jun. 28, 2001, now abandoned, which was a continuation of U.S. Ser. No. 09/400,002, filed Sep. 20, 1999 (now abandoned), which was a continuation-in-part application of U.S. Ser. No. 09/162,864, filed Sep. 29, 1998 (now abandoned).

FIELD OF INVENTION

This invention relates to calcium fortified protein-containing products, processes for making such products; and concentrated calcium solutions used in making such products.

BACKGROUND OF THE INVENTION

In addition to being the basic building block of bones and teeth, calcium is required for blood coagulation and the proper functioning of the heart, nerves, and muscles. As many individuals, especially elderly individuals, do not obtain sufficient levels of calcium from their diets, calcium supplementation is desired. A preferred method of increasing calcium intake is to replace,fluids that are normally consumed, with calcium-fortified versions of such fluids.

Unfortunately, the development of calcium-fortified products has met with numerous obstacles. With respect to beverages in particular, attempts at producing calcium fortified protein-containing beverages have resulted in products that have low soluble calcium concentrations; suspension settlement issues; unacceptable off flavors that are described as bitter, metallic, chalky, and mineral-like; poor textures as a result of added stabilizers or chelating agents; or a combination of these drawbacks.

In addition to having low soluble calcium concentrations and poor organoleptic properties, it is known that current calcium fortified protein-containing beverages require stabilizers, chelating agents, and special production processes, as when such beverages are pasteurized after being fortified, their proteins are destabilized. Such destabilization typically results in protein flocculation and calcium settlement issues that become problematic at higher levels of calcium fortification.

As a result of the aforementioned product and product processing problems, it is clear that there remains a need for a stable, hedonically acceptable calcium fortified protein-containing beverage that effectively and efficiently delivers calcium.

SUMMARY OF THE INVENTION

In a first aspect, the present invention relates to a calcium fortified protein-containing product comprising, in addition to any soluble calcium that is inherently present in the product, a quantity of soluble calcium. Surprisingly, such product does not require an added stabilizer or chelating agent to achieve high levels of soluble calcium and product stability. However, when such materials are employed, surprisingly higher levels of soluble calcium may be obtained.

The invention also relates to foods and beverages containing such products, as well as concentrated calcium solutions used to produce such beverages and processes for producing same are also disclosed.

In one such embodiment, the invention relates to a calcium fortified mammals milk comprising: (a) in addition to any soluble calcium present prior to calcium fortification, at least about 1340 parts per million (ppm) of soluble calcium; and (b) essentially zero weight % of a chelating agent.

In another such embodiment, the invention relates to a calcium fortified mammals milk comprising:
  a.) in addition to any soluble calcium present prior to calcium fortification, at least about 950 ppm of soluble calcium;
  b.) essentially zero weight % of a stabilizer; and
  c.) essentially zero weight % of a chelating agent.

In yet another such embodiment, the invention relates to a calcium fortified mammals milk comprising, in addition to any soluble calcium present prior to calcium fortification, at least about 1890 ppm of soluble calcium.

In still another embodiment, the invention relates to a calcium fortified plant milk comprising, in addition to any soluble calcium present prior to calcium fortification, at least about 700 ppm of soluble calcium; and essentially zero weight % chelating agent.

In still another embodiment, the invention relates to a calcium fortified plant milk comprising, in addition to any soluble calcium present prior to calcium fortification, at least about 700 ppm of soluble calcium and at least about 0.01 weight % chelating agent.

In a second aspect, the present invention relates to processes for making calcium fortified protein-containing products and methods of using such products. In one such embodiment, the invention relates to a process of making a calcium fortified mammals milk, the process comprising the steps of:
  a.) providing a mammals milk and a concentrated metastable calcium solution comprising at least about 10,000 ppm soluble calcium;
  b.) combining the mammals milk and the concentrated calcium solution;
  c.) adjusting the pH of the combination to yield a milk having a pH from about 6.5 to about 7.3; and
  d.) heat treating the milk.

In another such embodiment, the invention relates to a process of making a calcium fortified mammals milk essentially free of stabilizer and chelating agent, the process comprising the steps of:
  a.) providing a mammals milk and a concentrated calcium citrate malate solution comprising at least about 10,000 ppm soluble calcium;
  b.) combining the mammals milk and the concentrated calcium citrate malate solution;
  c.) adjusting the pH of the combination to yield a milk having a pH from about 6.6 to about 7.3; and
  d.) heat treating the milk.

In another such embodiment, the invention relates to a process of making a calcium fortified plant milk, said process comprising the steps of:
  a.) providing a plant milk and a concentrated calcium solution comprising at least about 10,000 ppm soluble calcium;

b.) combining the plant milk and the concentrated calcium solution;

c.) adjusting the pH of the combination to yield a plant milk having a pH from about 6.4 to about 8.5; and d.) heat treating the plant milk.

All documents cited are, in relevant part, incorporated herein by reference; the citation of any document is not to be construed as an admission that it is prior art with respect to the present invention.

DETAILED DESCRIPTION OF THE INVENTION

A. Definitions

As used herein, "additional soluble calcium" means the amount of soluble calcium in a product that results from fortification (i.e., excludes the soluble calcium present in the product prior to calcium fortification). A method for measuring additional soluble calcium is described in Analytical Method 2, infra.

As used herein, "essentially zero weight %" with respect to a given material means the material is included at a level that one skilled in the art would recognize as being less than functional to achieve the stated or recognized purpose for such material. For example, if a material that is otherwise known as a beverage stabilizer is included in a beverage such that it provides some level of stabilization, yet the skilled artisan would recognize that there is insufficient levels of the material to stabilize the entire product in question, then the material would be at a level of "essentially zero weight %." Thus, unless otherwise stated, "essentially zero weight %" is a qualitative not quantitative term.

As used herein, "free organic acids" means organic acids that are added to a neutralized meta-stable calcium complex or solution comprising such complex, after such complex or solution is formed.

As used herein, "heat treating" refers to treatment processes wherein beverages or beverage components are heated, to temperatures and for periods of time sufficient to inactivate enzymes and to destroy microorganisms, without substantial alteration of the chemical composition or sensory characteristics of the treated composition. The term heat treating encompasses the terms "pasteurize", "pasteurization", "sterilize" and "sterilization".

As used herein, "protein-containing products" encompasses products containing or derived from milk from mammals, including cows and goats; plant materials, including soy beans; and mixtures thereof.

As used herein, "stable" means stable according to Applicants' Analytical Method 4, which is described below.

Except as otherwise noted, the articles "a", "an", and "the" mean "one or more".

Unless stated otherwise, all product characteristics stated herein are as determined using Applicants' analytical methods. All such analytical methods are found in the Analytical Methods Section of this specification.

B. Stable Calcium Fortified Protein Containing Beverages

A key advantage of Applicants' invention is that Applicants' embodiments, particularly those that are beverages, comprise far greater amounts of soluble calcium than conventional calcium fortified protein-containing beverages. Certain embodiments of Applicants' beverage-related invention comprise as much or more soluble calcium as current calcium fortified milks, yet unlike these beverages, Applicants' beverage invention does not require added stabilizers or chelating agents. When stabilizers are introduced and such beverage's pH is adjusted in accordance with the teachings contained herein, a stable beverage having organoleptic properties similar to an unfortified beverage can be produced. As a result, certain embodiments of Applicants' beverage invention can provide the combined benefits of high levels of soluble calcium, product stability and superior organoleptic properties. In addition to being consumed neat, Applicants' calcium fortified beverages may be combined with other food and beverage items, thereby providing such food or beverage items with enhanced calcium levels.

While particular embodiments of the present invention have been illustrated and described in detail below, such detailed description is non-limiting as one skilled in the art would appreciate that Applicants' teachings could be used to produce calcium fortified beverages having a variety of soluble calcium concentrations.

Mammals Milk Embodiments

In one aspect, the invention relates to a calcium fortified mammals milk comprising, in addition to any soluble calcium present prior to fortification, at least about 1890 ppm of soluble calcium (additional soluble calcium). In such embodiments, it is optional to use a chelating agent and/or a stabilizer to achieve that level of soluble calcium. In this aspect, the mammals milk will typically include at least about 2000 ppm, more typically at least about 2100 ppm, of additional soluble calcium.

Certain mammals milk embodiments that do not include functional levels of an added stabilizer or chelating agent comprise at least about 950 ppm of soluble calcium in addition to the soluble calcium prior to fortification (i.e., additional soluble calcium). In one aspect, the mammals milk will comprise at least about 1050 ppm. In another aspect, the mammals milk will comprise at least about 1300 ppm, of additional soluble calcium. Typically, such milks will comprise up to about 1870 ppm, of additional soluble calcium. Such milks will typically have a pH of from about 6.5 to about 7.3 and a viscosity of less than 25 centipoise (cps). Other mammals milk embodiments that do not require an added stabilizer or chelating agent comprise up to 1670 ppm of additional soluble calcium, and typically have a pH of from about 6.7 to about 7.1 and a viscosity of less than 18 cps. Other mammals milk embodiments that do not require an added stabilizer or chelating agent comprise up to 1450 ppm of additional soluble calcium, and typically have a pH of from about 6.7 to about 7.0 and a viscosity of less than 10 cps.

Certain mammals milk embodiments that optionally comprise a stabilizer but do not include a functional amount of a chelating agent comprise at least about 1340 ppm of additional soluble calcium. In one such aspect, the mammals milk will comprise at least about 1450 ppm. In another such aspect, the mammals milk will comprise at least about 1550 ppm, of additional soluble calcium. Such mammals milk will typically comprise up to 3100 ppm additional soluble calcium, from about 0.002 weight % to 2.5 weight % of an added stabilizer, and typically have a pH of from about 6.5 to about 7.3 and a viscosity of less than 75 cps. Such embodiments optionally comprise 0 weight % to 0.5 weight % of a chelating agent. Other mammals milk embodiments comprise up to 2500 ppm additional soluble calcium and from about 0.002 weight % to 1.0 weight % of an added stabilizer, and typically have a pH of from about 6.6 to about 7.1 and a viscosity of less than 40 cps. Such embodiments optionally comprise 0 weight % to 0.35 weight % of a chelating agent. Other mammals milk embodiments comprise up to 2200 ppm additional soluble calcium and from about 0.005 weight % to 0.5 weight % of an added stabilizer, and typically have a pH of from about 6.7 to about 6.9 and a viscosity of less than 18 cps. Such embodiments optionally comprise 0 weight % to 0.15 weight % of a chelating agent.

Plant Milk Embodiments

In one aspect, the invention relates to a calcium fortified plant milk comprising, in addition to any soluble calcium present prior to fortification, at least about 700 ppm of soluble calcium (additional soluble calcium). In such embodiments, it is optional to use a chelating agent and/or a stabilizer to achieve very high levels of soluble calcium. In this aspect, the plant milk will typically include at least about 840 ppm, more typically at least about 1050 ppm, of additional soluble calcium. Where a chelating agent is used, typical levels of additional soluble calcium range from about 700 ppm to about 4500 ppm, although higher levels may be achieved. Where no chelating agent or stabilizer is used, typical levels of additional soluble calcium range from about 700 ppm to about 1670 ppm.

Certain plant milk embodiments that do not require an added stabilizer or chelating agent typically have a pH of from about 6.4 to about 8.5 and a viscosity of less than 40 cps. Other plant milk embodiments that do not require an added stabilizer or chelating agent comprise up to 1500 ppm of additional soluble calcium, and typically have a pH of from about 6.4 to about 8.5 and a viscosity of less than 35 cps. Other plant milk embodiments that do not require an added stabilizer or chelating agent comprise up to 1250 ppm of additional soluble calcium, and typically have a pH of from about 6.4 to about 8.5 and a viscosity of less than 25 cps.

Certain plant milk embodiments comprise up to 4500 ppm additional soluble calcium, and from about 0.01 weight % to 1.0 weight % of an added chelating agent, and typically have a pH of from about 6.4 to about 8.5 and a viscosity of less than 40 cps. Such embodiments optionally comprise 0 weight % to 2.5 weight % of a stabilizer. Other plant milk embodiments comprise up to 2500 ppm additional soluble calcium and from about 0.04 weight % to 0.7 weight % of an added chelating agent, and typically have a pH of from about 6.4 to about 8.5 and a viscosity of less than 35 cps. Such embodiments optionally comprise 0 weight % to 1.0 weight % of a stabilizer. Other plant milk embodiments comprise up to 2100 ppm additional soluble calcium and from about 0.08 weight % to 0.5 weight % of an added chelating, and typically have a pH of from about 6.4 to about 8.5 and a viscosity of less than 25 cps. Such embodiments optionally comprise 0 weight % to 0.5 weight % of a stabilizer.

Suitable Stabilizers and Chelating Agents

When employed, suitable stabilizers include glycerin, propylene glycol, carageenan, gum Arabic, guar gum, gum ghatti, xanthan, gellan, locust bean gum, modified and unmodified pectin, modified and unmodified starches, algins, propylene glycol alginate, carboxymethyl cellulose, hydroxypropyl cellulose, hydroxypropyl methyl cellulose, methyl cellulose, hydrolyzed polysaccharides, agar, sodium caseinate, and emulsifiers such as; citric acid esters of monoglycerides, tartaric acid esters of monoglycerides, stearyl lactylates, enzyme modified lecithin, stearyl citrate, fatty acids and their salts, calcium salts of citric acid esters of monoglycerides and tartaric acid esters of monoglycerides, and mixtures thereof.

Carrageenan is sold under the trade name TIC Colloid 710H by TIC Gum Inc., of Belcamp, Md. USA; pectin is sold under the trade name Unipectin 150 RS by Degussa Texturant Systems of Atlanta, Ga. USA; gum Arabic is sold under the trade name TIC Gum Arabic FT by TIC Gum Inc., of Belcamp, Md. USA; and gum guar is sold under the trade name TIC Gum Guar 200HV by TIC Gum Inc., of Belcamp, Md. USA.

When employed, suitable chelating agents include free organic acids and their alkali metal salts; such as citric acid, malic acid, gluconic acid, sodium citrate, potassium citrate, sodium carbonate, potassium carbonate, sodium bicarbonate, potassium bicarbonate, polyphosphates such as; sodium tripolyphosphate, sodium hexa meta phosphate, and sodium acid pyrophosphate, mono sodium dihydrogen orthophosphate, disodium hydrogen orthophosphate, trisodium orthophosphate, mono potassium dihydrogen orthophosphate, dipotassium hydrogen orthophosphate, tripotassium orthophosphate, and mixtures thereof.

Sodium citrate and potassium citrate are sold by Cargill Inc. of Eddyville, Ill. USA and sodium hexa meta phosphate is sold by FMC Phosphorus Chem. of Philadelphia, Pa. USA.

C. Concentrated Soluble Calcium Solution

Applicants' concentrated soluble calcium solution comprises a sufficient amount of meta-stable calcium complex, such as calcium citrate malate, to provide the high levels of soluble calcium detailed herein. Added stabilizers, such as sucrose, glucose, fructose, high fructose corn syrup, invert sugar, sugar alcohols, pectin, algins, hydrolyzed starches, edible gums and polysaccharides, glycerin, propylene glycol and mixtures thereof are not required to obtain such high levels of soluble calcium.

Certain embodiments of Applicants' concentrated calcium solution comprise a sufficient amount of meta-stable calcium complex to provide at least 10,000 ppm, typically from about 10,000 ppm to about 74,000 ppm, of soluble calcium, 80% of which remains in solution for at least six hours after such solution is prepared and stored at 3° C. When such embodiment comprises calcium citrate malate, such calcium citrate malate has a molar ratio of calcium:citrate:malate, as determined in its solid state, of from about 6:0.67:5 to about 6:3.34:1. Other embodiments of Applicants' concentrated calcium solution comprise a sufficient amount of meta-stable calcium complex to provide from about 20,500 ppm to about 62,000 ppm of soluble calcium, 85% of which remains in solution for at least two hours after such solution is prepared and stored at 3° C., and 80% of which remains in solution for at least six hours after such solution is prepared and stored at 3° C. When such embodiment comprises calcium citrate malate, such calcium citrate malate has a molar ratio of calcium:citrate:malate, as determined in its solid state, of from about 6:1:4.5 to about 6:3:1.5. Other embodiments of Applicants' concentrated calcium solution comprise a sufficient amount of meta-stable calcium complex to provide from about 30,800 ppm to about 51,000 ppm of soluble calcium, 95% of which remains in solution for at least two hours after such solution is prepared and stored at 3° C., and 80% of which remains in solution for at least six hours after such solution is prepared and stored at 3° C. When such embodiment comprises calcium citrate malate, such calcium citrate malate has a molar ratio of calcium:citrate:malate, as determined in its solid state, of from about 6:1:4.5 to about 6:3:1.5.

D. Processes of Making Stable Protein-Containing Beverages and Concentrated Calcium Solutions In addition to having low soluble calcium concentrations and poor organoleptic properties, it is known that current calcium fortified protein-containing beverages require stabilizers, chelating agents, and special production processes, as when such beverages are calcium fortified and then pasteurized, their proteins are typically destabilized. Unlike prior processes, Applicants' preferred processes for producing protein-containing products allow such products to be formulated without added stabilizers or chelating agents, and then heat treated. As a result, Applicants' process offers significant process advantages as such products (particularly beverages) can be produced using the same process flow and equipment that is used to produce unfortified products. In addition, when stabilizers or chelating agents are introduced, stable products containing significantly higher soluble calcium levels than those of currently disclosed products can be produced.

Meta-stable concentrated soluble calcium solutions are important materials used in Applicants' aforementioned processes as the addition of powdered calcium complexes tends to result in settling issues and poor organoleptic properties. Unfortunately, current meta-stable concentrated soluble calcium solutions lack the stability that is required for commercial scale production of calcium fortified protein-containing beverages. However, Applicants have discovered how to produce such a solution. Such process is detailed herein.

Concentrated Soluble Calcium Solutions

It is known that the solubility of materials increases with temperature. Surprisingly, Applicants' have discovered that this principle does not apply to certain meta-stable complexes such as meta-stable calcium complexes. Instead, the solubility and stability of such complexes in solution appear to increase with decreasing their temperature. Based on the aforementioned discovery, Applicants have invented a process that results in highly concentrated solutions of soluble calcium that may be used to calcium-fortify food and beverage products.

Applicants' process of making a concentrated soluble calcium solution comprises the steps of making a calcium suspension or solution comprising at least 14,400 ppm, typically from about 14,400 ppm to about 185,000 ppm, of a calcium source while maintaining said suspension or solution's temperature at or below 24° C.; combining a sufficient amount of said calcium suspension or solution, while maintaining said suspension or solution's temperature at or below 24° C., and an organic acid blend comprising a first organic acid material and a second organic acid material in a ratio of first organic acid material to second organic acid material of from about 0.2:1 to about 4.8:1, to obtain a concentrated calcium solution having at least 10,000 ppm soluble calcium; and maintaining the resulting concentrated soluble calcium solution's temperature at about or below 24° C. until use.

Another embodiment of Applicants' process of making a concentrated soluble calcium solution comprises the steps of making a calcium suspension or solution comprising at least 28,000 ppm, typically from about 28,000 ppm to about 154,000 ppm, of a calcium source while maintaining said suspension or solution's temperature at or below 16° C.; combining a sufficient amount of said calcium suspension or solution, while maintaining said suspension or solution's temperature at or below 16° C., and an organic acid blend, comprising a first organic acid material and a second organic acid material in a ratio of first organic acid material to second organic acid material of from about 0.3:1 to about 2.9:1, to obtain a concentrated calcium solution having at least 20,500 ppm soluble calcium; and maintaining the resulting concentrated soluble calcium solution's temperature at about or below 16° C. until use.

Another embodiment of Applicants' process of making a concentrated soluble calcium solution comprises the steps of making a calcium suspension or solution comprising at least 43,000 ppm, typically from about 43,000 ppm to about 128,000 ppm, of a calcium source while maintaining said suspension or solution's temperature at or below 6° C.; combining a sufficient amount of said calcium suspension or solution, while maintaining said suspension or solution's temperature at or below 6° C., and an organic acid blend, comprising a first organic acid material and a second organic acid material in a ratio of first organic acid material to second organic acid material of from about 0.5:1 to about 1:1, to obtain a concentrated calcium solution having at least 30,800 ppm soluble calcium; and maintaining the resulting concentrated soluble calcium solution's temperature at about or below 6° C. until use.

Suitable calcium sources include but are not limited to calcium oxide, calcium hydroxide, calcium carbonate and mixtures thereof. Suitable first organic acid materials include citric acid, hydroxy citric acid and mixtures thereof. Malic acid is a preferred second organic acid material.

Mammals Milk Embodiments

Applicants' process of making a calcium fortified mammals milk comprises the steps of providing milk, and a concentrated calcium solution comprising at least 10,000 ppm soluble calcium; combining said concentrated calcium solution and milk; adjusting the pH of said combination; and heat treating the resulting fortified milk. A stabilizer and/or chelating agent are generally added if calcium fortified milk comprising at least 1870 ppm soluble calcium, in addition to any soluble calcium inherently present in said milk, is desired. If a stabilizer or chelating agent are added, such materials are typically added to the milk prior to combining said milk and concentrated calcium solution. Typically from 0.002 weight % to about 2.5 weight % stabilizer and from 0.01 weight % to about 0.6 weight % of a chelating agent are added. Generally, sufficient milk and concentrated calcium solution are combined to yield a stabilizer-free calcium fortified milk comprising, in addition to any soluble calcium inherently present in said milk, at least 700 ppm soluble calcium. However, when in possession of the teachings of this specification, one skilled in the art would appreciate that Applicants' method could be used to produce calcium fortified milks having a variety of soluble calcium concentrations. Typically the step of adjusting the pH range of the calcium fortified milk entails adding sufficient amounts of acidic or basic materials to provide a stabilizer-free milk with a pH of from about 6.6 to about 7.3, or a stabilizer containing milk with a pH of from about 6.5 to about 7.3.

Plant Milk Embodiments

Applicants' process of making a calcium fortified plant milk comprises the steps of providing plant milk and a concentrated calcium solution comprising at least 10,000 ppm soluble calcium; combining said plant milk and the concentrated calcium solution; adjusting the pH of said combination; and heat treating to provide a fortified plant milk. A chelating agent is generally added if a calcium fortified milk comprising at least 1670 ppm soluble calcium, in addition to any soluble calcium inherently present in said milk, is desired. If a stabilizer or chelating agent are added, such materials are typically added to the milk prior to combining the starting plant milk and the concentrated calcium solution. Typically when a chelating agent is added, it is added at a level of at least 0.01 weight %. Generally, sufficient plant milk and concentrated calcium solution are combined to yield a stabilizer free calcium fortified milk comprising, in addition to any soluble calcium inherently present in said milk, at least 700 ppm soluble calcium. However, when in possession of the teachings of this specification one skilled in the art would appreciate that Applicants' method could be used to produce calcium fortified milks having a variety of soluble calcium concentrations. Typically the step of adjusting the pH range of the calcium fortified milk entails adding sufficient amounts of acidic or basic materials to provide a chelating agent-free milk or a chelating agent-containing milk with a pH of from about 6.4 to about 8.5.

E. Analytical Methods

Analytical Method 1—Viscosity Measurement

Test products must be stored for 24 hours at 5° C. and then tested as follows:

a.) Samples having viscosities up to and including 35 cps:

A Brookfield Rheoset Programmable viscometer equipped with a UL adaptor, fitted with a ULA cylindrical spindle is used. Operating pressure should be ambient.
(i) Pour 15 mL of sample into the sample cup of the UL-adaptor.
(ii) Place the UL-adaptor in an 11° C. water-bath.
(iii) Allow the sample to equilibrate in the water-bath for 10 minutes before taking a reading.
(iv) Set the rheoset at zero before attaching the UL-adaptor.
(v) When measuring sample viscosity run the analysis at the parameters listed below. For purposes of Applicants' invention, the viscosity obtained at a speed of 12 revolutions per minute (rpm) and a rate of 14.7 $sec^{-1}$ at 300 seconds is deemed a sample's viscosity.

| Speed (rpm) | Rate ($sec^{-1}$) | Time (sec) |
| --- | --- | --- |
| 0.5 | 0.6 | 0 |
| 1.0 | 1.2 | 30 |
| 3.0 | 3.7 | 60 |
| 6.0 | 7.3 | 90 |
| 12.0 | 14.7 | 120 |
| 24.0 | 29.4 | 150 |
| 48.0 | 58.7 | 180 |
| 96.0 | 117.0 | 210 |
| 48.0 | 58.7 | 240 |
| 24.0 | 29.4 | 270 |
| 12.0 | 14.7 | 300 |
| 6.0 | 7.3 | 330 |
| 3.0 | 3.7 | 360 |
| 1.0 | 1.2 | 390 |
| 0.5 | 0.6 | 420 | b.) Samples having viscosities greater than 35 cps

A Brookfield Rheoset Programmable viscometer equipped with a small sample adaptor, fitted with a SC4–18 cylindrical spindle is used. Operating pressure should be ambient.
(i) Pour 2 mL of sample into the sample cup of the UL-adaptor.
(ii) Place the UL-adaptor in an 11° C. water-bath.
(iii) Allow the sample to equilibrate in the water-bath for 10 minutes before taking a reading.
(iv) Set the rheoset at zero before attaching the UL-adaptor.
(v) When measuring sample viscosity run the analysis at the parameters listed below. For purposes of Applicants' invention, the viscosity obtained at a speed of 12 rpm and a rate of 15.8 $sec^{-1}$ at 300 seconds is deemed a sample's viscosity.

| Speed (rpm) | Rate ($sec^{-1}$) | Time (sec) |
| --- | --- | --- |
| 0.5 | 0.7 | 0 |
| 1.0 | 1.3 | 30 |
| 3.0 | 4.0 | 60 |
| 6.0 | 7.9 | 90 |
| 12.0 | 15.8 | 120 |
| 24.0 | 31.7 | 150 |
| 48.0 | 63.4 | 180 |
| 60.0 | 79.2 | 210 |
| 48.0 | 63.4 | 240 |
| 24.0 | 31.7 | 270 |
| 12.0 | 15.8 | 300 |
| 6.0 | 7.9 | 330 |
| 3.0 | 4.0 | 360 |
| 1.0 | 1.3 | 390 |
| 0.5 | 0.7 | 420 |

Analytical Method 2—Soluble Calcium Content Measurement

The soluble calcium level of unfortified protein-containing beverage is determined at time t=0 and then the soluble calcium level of the corresponding calcium fortified beverage is determined as follows:

Concentrated calcium solution t=0

Protein-containing Beverage t=24 hours

Amount of soluble calcium fortification (i.e., additional soluble calcium)=(ppm soluble calcium in fortified product)−(ppm soluble calcium in unfortified product)

a.) Sample preparation (i) Concentrated Soluble Calcium Solution A 30 mL sample is withdrawn from a bulk concentrate. The sample is filtered through Whatman #1 filter paper to remove suspended material, including any insoluble calcium. Two grams of the clear filtrate is diluted to 100 grams with distilled, deionized water.

(ii) Calcium Fortified Protein-containing Beverage A 30 mL sample is withdrawn from a bulk calcium fortified protein-containing beverage prepared according to the present invention (and stored at 4° C.), without disturbing the bulk beverage. The sample is filtered through Whatman #1 filter paper to remove suspended material, including any insoluble calcium. The sample is then analyzed without dilution.

(iii) Unfortified Protein-containing Beverage A 30 mL sample is withdrawn from a bulk sample of the unfortified protein-containing beverage used to make the Calcium Fortified Protein-containing Beverage (stored at 4° C.), without disturbing the bulk beverage. The sample is filtered through Whatman #1 filter paper to remove suspended material. The sample is then analyzed without dilution.

b.) Equipment

An Orion Autochemistry System, Model 960 fitted with Calcium Ion Selective Electrode is used for soluble calcium measurement. One mL of calcium ionic strength adjuster (BSP 5900-16) and 5 mL of Calcium/Magnesium titration reagent (Orion # Ca-6520-12) are added.

c.) Procedure (i) Condition the calcium electrode by placing such electrode in 0.0025 M calcium standard solution for at least 60 minutes before sample measurement.

(ii) Verify the system accuracy by determining the concentration of the calcium standard. The value obtained should be 405+/−10 mg per 100 g.

(iii) For the milk or concentrated calcium solutions of Step a(i) and a(ii), dilute the following weight of such sample, as indicated in the table below, with distilled and deionized water to a volume of 50 mL.

| Sample Weight (gms) | Estimated Soluble Calcium Concentration |
| --- | --- |
| 0.2 | 4500 ppm |
| 0.4 | 2250 ppm |
| 0.6 | 1500 ppm |
| 0.8 | 1125 ppm |
| 1.0 | 900 ppm |

(iv) Determine the soluble calcium level by the first derivative technique.

d.) Method Parameters

| Technique | First Derivative |
| --- | --- |
| Titrant | 0.01 M |
| Constant Increment | 5.0 mV |
| Max. Titrant Volume | 6.000 mL |
| Electrode | 2: Ca++ |
| Time Reading | 3.0 sec |
| Prestir | 5.0 sec |
| Reaction Ratio | 1.0000 |
| Molecular Weight | 40.08 |
| Unit | mg/100 g |
| No. of endpoints | 1 |

Analytical Method 3—Taste Test

When determining the overall acceptance rating of a calcium fortified protein-containing product, the product is evaluated by a panel of 15 or more panelists to provide statistically valid results having a confidence interval of at least 95%. The respective unfortified protein-containing beverage is used as a control. The test products are evaluated using blind product paired test. A nine point hedonic scale is used to judge the overall acceptability of the calcium fortified products. Such scale and methodology can be found on pages 101–103 and 213 of Sensory Evaluation Techniques, $2^{nd}$ Edition by Morten Meilgaard et al., CRC Press, 1991.

Analytical Method 4—Physical Stability Assessment a.) Obtain a 500 mL sample of test product immediately after preparation and store such sample in clear PET containers at 4° C. for 72 hours—do not move or otherwise agitate the sample during storage.

b.) At 24 hours and 72 hours check the samples, without disturbing them, for any separation or sedimentation. Samples having no visibly distinct separation into two separate phases are adjudged stable.

Analytical Method 5—pH Assessment a.) Equipment: A Corning pH meter Model 440 is used.

b.) Procedure:

(i) Calibrate the pH meter is using calibration buffer pH 7.0 at 22° C.

(ii) Select the "Autoread" feature for automatic end-point detection.

(iii) Place 50 mL of sample in a 100 mL glass beaker with a bar magnet.

(iv) Stir the sample at 20 rpm.

(v) Take a pH reading.

EXAMPLES

The following examples are illustrative of the present invention but are not meant to be limiting thereof.

Example 1

Concentrated Soluble Calcium Solution

| Ingredients | % w/w |
| --- | --- |
| Calcium hydroxide | 3.97 |
| Citric acid | 3.66 |
| Malic acid | 3.75 |
| Water | 88.62 |
| | 100.00 |

The citric and malic acids are dry blended. Calcium hydroxide is dispersed in 80% of the water using a propeller stirrer. The temperature of the slurry is maintained at 3° C. The acids and the remaining water are added to calcium hydroxide slurry and mixed to get clear solution. The temperature during the neutralization phase is maintained below about 6° C. Immediately after being prepared, the solutions' soluble calcium concentration is determined and then the solution is stored at 3° C. for six hours at which time the solution's soluble calcium concentration is determined. Each measurement is preformed according to Applicants' Analytical Methods. The solution is found to comprise 21,000 ppm soluble calcium at time zero and at least 19,950 ppm (95% of initial soluble calcium) after six hours.

Example 2

Concentrated Soluble Calcium Solution

| Ingredients | % w/w |
|---|---|
| Calcium hydroxide | 7.94 |
| Citric acid | 7.32 |
| Malic acid | 7.50 |
| Water | 77.24 |
| | 100.00 |

The citric and malic acids are dry blended. Calcium hydroxide is dispersed in 80% of the water using a propeller stirrer. The temperature of the slurry is maintained at 3° C. The acids and the remaining water are added to calcium hydroxide slurry and mixed to get clear solution. The temperature during the neutralization phase is maintained below about 6° C. Immediately after being prepared, the solutions' soluble calcium concentration is determined and then the solution is stored at 3° C. for six hours at which time the solution's soluble calcium concentration is determined. Each measurement is preformed according to Applicants' Analytical Methods. The solution is found to comprise 41,500 ppm soluble calcium at time zero and at least 37,350 ppm (90% of initial soluble calcium) after six hours.

Example 3

Stabilizer- and Chelating Agent-Free Milk Containing 51.6% of the RDA of Ca

The calcium fortified milk containing 2150 ppm of calcium and having hedonic score of at least 5 is made as follows: 393 gm of the liquid concentrate is prepared as in Example 2 and added to 15.4 kg of full fat milk at temperature about 35° C. and mixed. 34 gm of full fat dry milk powder is added for adjusting the milk solids to account for dilution resulting from addition of liquid CCM concentrate solution. The pH of the milk is adjusted between 6.6 and 7.3 with 20% sodium hydroxide solution. The final product is pasteurized at 85° C. for 15 sec, homogenized at 49° C. in a two stage homogenizer, wherein the pressure of the first stage is 140 kg/cm$^2$ and the second stage is 35 kg/cm$^2$, and cooled immediately 4° C. Prior to calcium fortification, the milk's soluble calcium concentration is determined. Then, 24 hours after being prepared, the calcium fortified milk's soluble calcium concentration is determined. Then the calcium fortified milk is stored at 3° C. for 2 weeks at which time the milk's soluble calcium concentration is again determined. Each measurement is preformed according to Applicants' Analytical Methods. The milk is found to comprise, at time t=24 hours and after 2 weeks, 2150 ppm soluble calcium. In addition, at the end of such two week period the milk is found to be stable.

Example 4

Milk Containing Stabilizer and 61.2% of the RDA of Calcium

The calcium fortified milk containing 2550 ppm of calcium and having hedonic score of at least 5 is made as follows: Four and one-half gm of kappa carrageenan (TIC gum) is dissolved or dispersed in 15.4 kg of 1% fat milk with vigorous mixing. 564 gm of the liquid concentrate is prepared as in Example 2 is added at temperature about 35° C. and mixed for 5–15 minutes. The pH of the milk is adjusted to 6.8 with 20% sodium hydroxide solution. The final product is pasteurized at 85° C. for 15 sec, homogenized at 49° C. in a two stage homogenizer, wherein the pressure of the first stage is 140 kg/cm$^2$ and the second stage is 35 kg/cm$^2$, and cooled immediately 4° C. Prior to calcium fortification, the milk's soluble calcium concentration is determined. Then, 24 hours after being prepared, the calcium fortified milk's soluble calcium concentration is determined. Then the calcium fortified milk is stored at 3° C. for 2 weeks at which time the milk's soluble calcium concentration is again determined. Each measurement is preformed according to Applicants' Analytical Methods. The milk is found to have a viscosity at time t=24 hours of 48 cps, and to comprise, at time t=24 hours and after 2 weeks, 2550 ppm soluble calcium. In addition, at the end of such two week period the milk is found to be stable.

Example 5

Milk Containing Stabilizer, Chelating Agent and 74.4% of the RDA of Calcium

To 191 gm of 1% skim milk, 100 mg of Sodium hexa meta phosphate and 30 mg of kappa carrageenan is added. The milk is heated to 60° C. for 5 minutes under agitation and cooled to 21° C. 9.6 gm of liquid CCM concentrate prepared in Example 2 is added and mixed for 5 to 10 minutes. The pH of the milk is adjusted between 6.6 to 6.9 with 20% sodium hydroxide solution. The milk is heated on a hot plate to a temperature of 79° C., held for 1 minute and cooled immediately in ice bath in less than 10 minutes to a temperature below 21° C. The weight is made to 200 gm with DI water and packed in PET bottle. Prior to calcium fortification, the milk's soluble calcium concentration is determined. Then, 24 hours after being prepared, the calcium fortified milk's soluble calcium concentration is determined. Then the milk is stored at 3° C. for 2 weeks at which time the milk's soluble calcium concentration is again determined. Each measurement is preformed according to Applicants' Analytical Methods. The milk is found to have a viscosity at time t=24 hours of 32 cps, and to comprise, at time t=24 hours and after 2 weeks, 3100 ppm soluble calcium; and is stable after 2 weeks.

Example 6

Chelating Agent-Free Soy Milk Containing 33.6% of the RDA of Calcium

The calcium fortified soymilk containing 1400 ppm of calcium, a viscosity of 22 cps and having hedonic score of at least 5 is made as follows: Seven gm of the liquid concentrate is prepared as in Example 2 and added to 200 gm of organic plain Silk Soymilk at temperature about 35° C. and mixed. The pH of the soymilk is adjusted to 8.25 with 20% sodium hydroxide solution. The milk is heated on a hot plate to a temperature of 79° C., held for 1 minute and cooled immediately in ice bath in less than 10 minutes to a temperature below 21° C. The weight is made to 207 gm with DI water and packed in PET bottle. Prior to calcium fortification, the milk's soluble calcium concentration is determined. Then, 24 hours after being prepared, the calcium fortified milk's soluble calcium concentration is determined. Then the milk is stored at 3° C. for 2 weeks at which time the milk's soluble calcium concentration is again determined. Each measurement is preformed according to Applicants' Analytical Methods. The milk is found to have a viscosity at time t=24 hours of 22 cps, and to comprise, at time t=24 hours and after 2 weeks, 1400 ppm soluble calcium; and is stable after 2 weeks.

Example 7

Soy Milk Containing a Chelating Agent and 33.6% of the RDA of Calcium

The calcium fortified milk containing 1405 ppm of soluble calcium, a viscosity of 7.8 cps and having hedonic score of at least 5 is made as follows:

One gm of potassium citrate is dissolved in 200 gm of organic plain Silk Soymilk. Seven gm of the liquid concentrate is prepared as in Example 2 is added at temperature about 35° C. and mixed. The pH of the soymilk is adjusted to 8.32 with 20% sodium hydroxide solution. The milk is heated on a hot plate to a temperature of 79° C., held for 1 minute and cooled immediately in ice bath in less than 10 minutes to a temperature below 21° C. The weight is made to 207 gm with DI water and packed in PET bottle. Prior to calcium fortification, the milk's soluble calcium concentration is determined. Then, 24 hours after being prepared, the calcium fortified milk's soluble calcium concentration is determined. Then the milk is stored at 3° C. for 2 weeks at which time the milk's soluble calcium concentration is again determined. Each measurement is preformed according to Applicants' Analytical Methods. The milk is found to have a viscosity at time t=24 hours of 7.8 cps, and to comprise, at time t=24 hours and after 2 weeks, 1405 ppm soluble calcium; and is stable after 2 weeks.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A calcium fortified mammals milk comprising:
   a.) in addition to any soluble calcium present prior to calcium fortification, at least about 1340 ppm of soluble calcium; and
   b.) essentially zero weight % of a chelating agent.

2. The calcium fortified mammals milk of claim 1 comprising from about 0.005 weight % to about 0.05 weight % of a stabilizer.

3. The calcium fortified mammals milk of claim 2 wherein the milk is dairy milk comprising, in addition to any soluble calcium present prior to calcium fortification, from about 1340 ppm to about 3100 ppm of soluble calcium.

4. A food or beverage product comprising the calcium fortified mammals milk of claim 1.

5. The calcium fortified mammals milk of claim 1, wherein said milk has a viscosity of less than 18 cps.

6. A food or beverage product prepared using the calcium fortified mammals milk of claim 1.

7. A calcium fortified mammals milk comprising
   a.) in addition to any soluble calcium present prior to calcium fortification, at least about 950 ppm of soluble calcium;
   b.) essentially zero weight % of a stabilizer; and
   c.) essentially zero weight % of a chelating agent.

8. The calcium fortified mammals milk of claim 7, wherein the milk is dairy milk comprising, in addition to any soluble calcium present prior to calcium fortification, from about 950 ppm to about 1870 ppm of soluble calcium.

9. The calcium fortified mammals milk of claim 7 having a taste score of at least 5 when tested according to Analytical Method 3.

10. The calcium fortified mammals milk of claim 7, wherein said milk has a viscosity of less than 18 cps.

11. The calcium fortified mammals milk of claim 10, wherein said milk has a viscosity of less than 10 cps.

12. A food or beverage product prepared using the calcium fortified mammals milk of claim 7.

13. A calcium fortified mammals milk comprising, in addition to any soluble calcium present prior to calcium fortification, at least about 1890 ppm of soluble calcium.

14. A food or beverage product prepared using the calcium fortified mammals milk of claim 13.

15. A process of making a calcium fortified mammals milk, the process comprising the steps of:
   a.) providing a mammals milk and a concentrated meta-stable calcium solution comprising at least about 10,000 ppm soluble calcium;
   b.) combining the mammals milk and the concentrated calcium solution;
   c.) adjusting the pH of the combination to yield a milk having a pH from about 6.5 to about 7.3; and
   d.) heat treating the milk.

16. The process of claim 15 wherein the concentrated meta-stable calcium solution is a concentrated calcium citrate malate solution.

17. The process of claim 15 wherein in Step (b) a sufficient amount of the concentrated calcium solution and the mammals milk provided in Step (a) are combined to yield a combination comprising, in addition to any soluble calcium present in the mammals milk provided in Step (a), from about 950 ppm to about 1870 ppm soluble calcium, wherein the process does not include a step of adding a stabilizer or a chelating agent.

18. The process of claim 15 wherein Step (a) includes providing a stabilizer and, prior to Step (b), combining a sufficient amount of the stabilizer and the mammals milk to yield a mixture comprising from about 0.002 weight % to about 2.5 weight % stabilizer; and wherein in Step (b) a sufficient amount of the concentrated calcium solution and the stabilizer-containing mixture are combined to yield a combination comprising, in addition to any soluble calcium present in the mammals milk provided in Step (a), from about 700 ppm soluble calcium to about 3100 ppm soluble calcium.

19. The process of claim 15 wherein in Step (a) the concentrated meta-stable calcium solution comprises from about 20,500 to about 74,000 ppm soluble calcium.

20. The process of claim 19 wherein in Step (a) the concentrated meta-stable calcium solution comprises from about 30,800 to about 74,000 ppm soluble calcium.

21. A calcium fortified plant milk comprising, in addition to any soluble calcium present prior to calcium fortification, at least about 700 ppm of soluble calcium; and essentially zero weight % chelating agent.

22. The calcium fortified plant milk of claim 21 comprising, in addition to any soluble calcium present prior to calcium fortification, from about 700 ppm to about 1670 ppm of soluble calcium and wherein the plant milk has a viscosity of less than 25 cps.

23. The calcium fortified plant milk of claim 21 having essentially zero weight % stabilizer.

24. The calcium fortified plant milk of claim 23 comprising, in addition to any soluble calcium present prior to calcium fortification, from about 700 ppm to about 4500 ppm of soluble calcium.

25. A food or beverage product comprising the calcium fortified plant milk of claim 21.

26. A food or beverage product prepared using the calcium fortified plant milk of claim 21.

27. The calcium fortified plant milk of claim 21, wherein said milk comprises, in addition to any soluble calcium present prior to calcium fortification, at least about 1050 ppm of soluble calcium.

28. The calcium fortified plant milk of claim 21, wherein said milk has a viscosity of less than 25 cps.

29. A process of making a calcium fortified plant milk, said process comprising the steps of:
   a.) providing a plant milk and a concentrated calcium solution comprising at least about 10,000 ppm soluble calcium;
   b.) combining the plant milk and the concentrated calcium solution;
   c.) adjusting the pH of the combination to yield a plant milk having a pH from about 6.4 to about 8.5; and
   d.) heat treating the plant milk.

30. The process of claim 29 wherein in Step (b) a sufficient amount of the concentrated calcium solution and the plant milk from Step (a) are combined to yield a combination comprising, in addition to any soluble calcium present in the plant milk provided in Step (a), from about 700 ppm soluble calcium to about 1670 ppm soluble calcium.

31. The process of claim 29 wherein Step (a) includes providing a chelating agent and, prior to said Step (b), combining a sufficient amount of said chelating agent and plant milk to yield a mixture comprising at least 0.01 weight % chelating agent; and wherein in Step (b) a sufficient amount of said concentrated calcium solution and chelating agent-containing mixture are combined to yield a plant milk comprising, in addition to any soluble calcium inherently present in the plant milk provided in Step (a), from about 700 ppm soluble calcium to about 4500 ppm soluble calcium.

32. A process of making a concentrated calcium solution, the process comprising the steps of:
   a.) making a calcium suspension or solution comprising at least about 14,400 ppm of a calcium source while maintaining the temperature of the suspension or solution at or below 16° C.;
   b.) combining a sufficient amount of
      (i) the calcium suspension or solution, while maintaining the suspension or solution's temperature at or below 16° C.; and
      (ii) an organic acid blend, comprising a first organic acid material and a second organic acid material in a ratio of first organic acid material to second organic acid material of from about 0.2:1 to about 4.8:1 to obtain a concentrated calcium solution having at least about 10,000 ppm soluble calcium; and
   c.) storing the concentrated solution formed in Step (b) at a temperature at or below 24° C. until use.

33. The process of claim 32 wherein Step (a) comprises making a calcium suspension or solution comprising from about 28,000 ppm to about 185,000 ppm of a calcium source.

34. The process of claim 32 wherein Step (b) comprises combining a sufficient amount of the calcium suspension or solution and the organic acid blend to obtain a concentrated calcium solution having from about 10,000 ppm to about 74,000 ppm soluble calcium.

35. A concentrated calcium solution made according to the process of claim 32, the solution comprising a sufficient amount of a calcium citrate malate complex having a calcium:citrate:malate ratio of from about 6:0.67:5 to about 6:3.34:1 to provide at least about 10,000 ppm soluble calcium, 80% of which remains in solution for at least two hours after such solution is prepared and stored at 3° C.

36. A food or beverage product comprising the concentrated calcium solution of claim 35.

37. A concentrated calcium solution made according to the process of claim 32 comprising a sufficient amount of meta-stable calcium complex to provide from about 10,000 ppm to about 74,000 ppm soluble calcium.

38. The process of claim 32 wherein in Step (b) the amount of the organic acid blend is sufficient to neutralize the calcium contained in the calcium suspension or solution.

39. A food or beverage product comprising a concentrated calcium solution made according to the process of claim 32.

40. A food or beverage product prepared using the concentrated calcium solution made according to the process of claim 32.

41. The process of claim 32 wherein in Step (c), the concentrated solution formed in Step (b) is maintained at a temperature at or below 16° C. until use.

42. The process of claim 32 wherein the temperatures set forth in subparagraphs (a), (b) and (c) are maintained at or below 6° C.

* * * * *